April 9, 1957   W. B. GUGGI   2,788,486
ELECTRICAL TESTING APPARATUS
Filed June 14, 1952   2 Sheets-Sheet 1

Inventor
Walter B. Guggi
By Willito, Helwig & Baillio
Attorneys

Inventor
Walter B. Guggi
By Willits, Helwig & Baillio
Attorneys

United States Patent Office 2,788,486
Patented Apr. 9, 1957

2,788,486

ELECTRICAL TESTING APPARATUS

Walter B. Guggi, La Grange, Ill., assignor to General Motors Corporation, Detroit, Mich., a corporation of Delaware Application June 14, 1952, Serial No. 293,617

2 Claims. (Cl. 324—51)

This invention relates to electrical testing apparatus and, more particularly to apparatus for testing coils for the presence of a short circuit condition therein. The present invention is adapted for rapid high production testing of air core coils in general, and is especially suited for testing wound coils of the type employed in electric motors and generators prior to installation therein.

In its broader aspects, the invention has for its objects to effect improvements in testing apparatus of this general character and, more specifically, to provide a highly sensitive and reliable test apparatus which affords a direct and positive indication of the presence of a short circuit coil condition.

In accordance with the invention, a coil to be tested for the presence of a short circuit condition therein is inductively coupled to a pair of inductor coils which are wound on separate cores and are magnetically balanced to eliminate the mutual inductance therebetween. One of the inductor coils is energized from a periodically varying voltage source and the test coil subjected to the electromagnetic influence thereof so as to have a substantial current flow induced therein if in short circuit condition. Current flow in the test coil is sensed by the other of the inductor coils, which is inductively coupled to the test coil, and is positively indicated by suitable indicating means. In order to mitigate internal capacitive effects prevailing at high frequencies between the turns of the test coil and to avoid otherwise necessary corrections therefor, a low frequency source of voltage is employed for energization of the system. The frequency of the supply source is made preferably different from 60 cycles in order to minimize the effects of stray 60 cycle fields in the plant where the testing may be performed.

The above and other objects, features and advantages attending the invention will appear more fully from the following detailed description and drawings, wherein.

Figure 1:
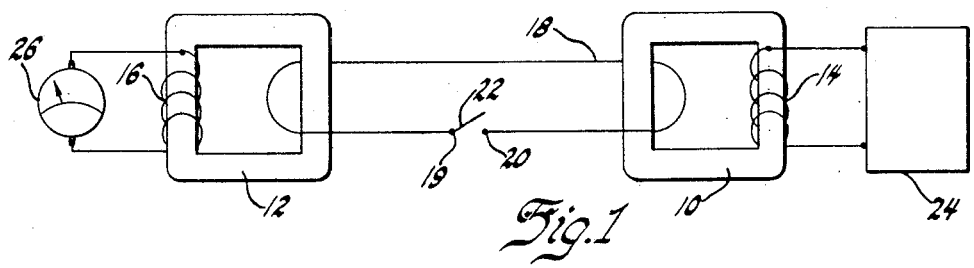
Fig. 1 is a schematic circuit illustration useful in understanding the invention.

Referring to the drawings, Fig. 1 illustrates a basic principle on which the invention is premised and comprises a first and second core 10 and 12, each of which has a separate inductor coil 14 and 16, respectively, wound thereon. The test coil 18, which is represented in Fig. 1 as a single turn with open ends or terminals 19 and 20, is wound or placed on each of the cores 10, 12 so that the part of the test coil on core 10 forms a secondary winding for the first inductor coil 14 and the part of the test coil on core 12 forms a primary winding for the second inductor coil 16. The switch 22 diagrammatically illustrates the condition of the test coil and is opened to indicate the absence of a short circuit condition and closed to indicate the presence of a short circuit condition therein.

The first inductor coil 14 is connected to a suitable source of periodically varying voltage 24 whereby an electric current will be established therein attended by a magnetic field in the core 10. Since the test coil is subjected to the influence of the field in the core 10, a voltage will be induced therein by transformer action and appear across the open terminals 19, 20 thereof. When the test coil is in shorted condition, as when switch 22 is closed, the voltage appearing across the terminals 19, 20 will be substantially zero and a value of short circuit current having a strong magnetic field associated therewith will be established. The presence of short circuit current flow in the test coil will be sensed by the second inductor coil 16, which is subjected to the field associated with the test coil, and a voltage will be induced in the inductor coil 16 and indicated by the deflection of a suitable indicating instrument 26 connected thereto. In the absence of a short circuit in the test coil, the current flow therein will be zero and the indicating instrument 26 will not be deflected by reason of the absence of a field due to the test coil.

Figure 3:
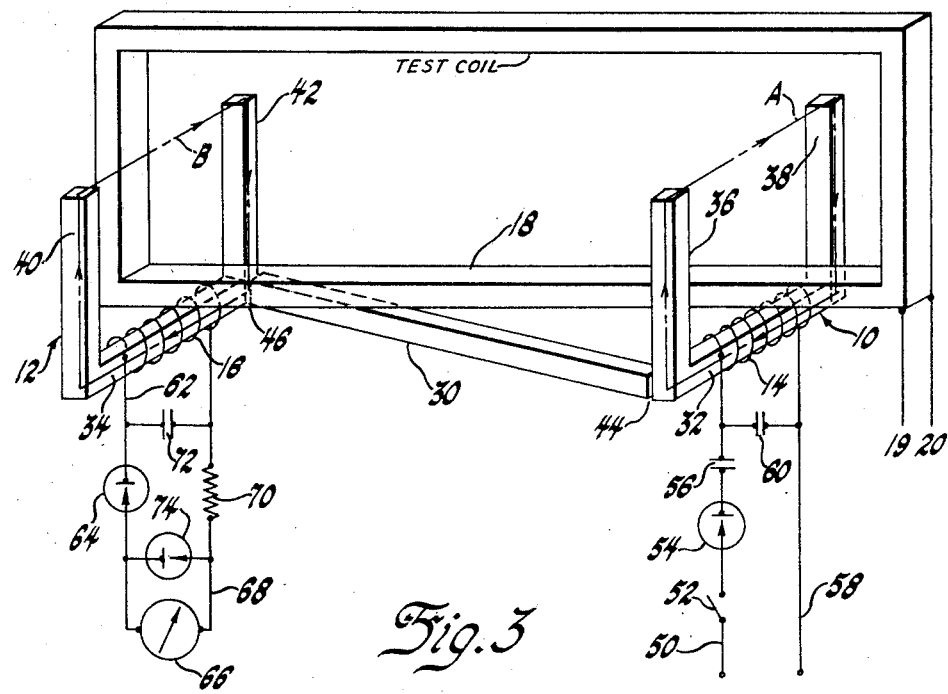
Fig. 3 is a schematic illustration of a preferred form of the testing apparatus of the present invention.

In order to facilitate routine testing of the test coils, it is preferable to provide gapped or U-shaped cores for the inductor coils 14, 16, substantially as illustrated in Fig. 3. In such case, since a substantial portion of the magnetic field produced in the core 10 is completed through the air, the inductor coils 14 and 16 will have an appreciable amount of mutual inductance therebetween and a considerable portion of the field produced in core 10 will link with the second inductor coil 16 so as to induce a voltage in the latter even in the absence of a short circuit condition in the test coil. The indicating instrument 26 may thus be deflected to produce a false indiction of the presence of a short circuit coil condition. It is, therefore, desirable to provide some means for balancing the inductors 14, 16 so as to eliminate the coupling or mutual inductance therebetween.

Figure 2:
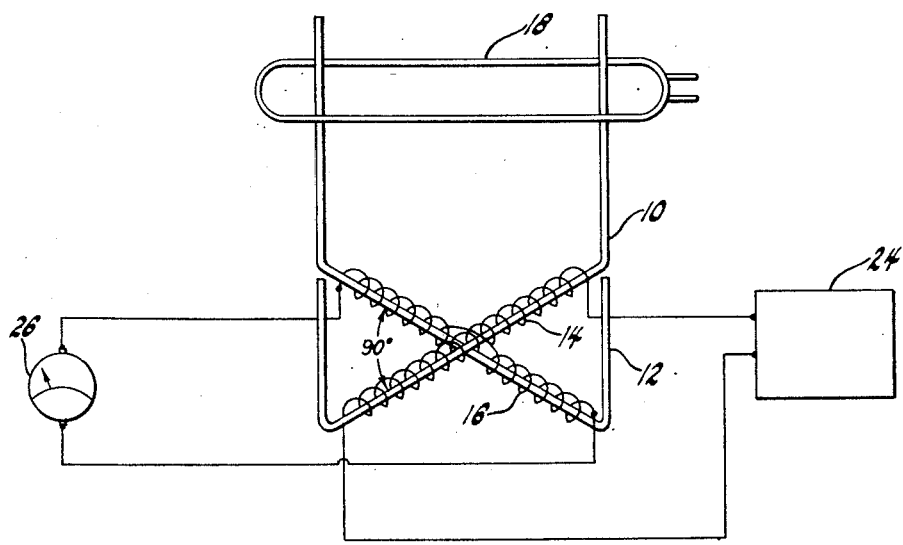
Fig. 2 is a schematic circuit illustration of one form of the present invention.

The above may be accomplished in accordance with one form of the present invention by disposing the inductors perpendicular to each other as shown in Fig. 2 which provides an essentially self-balanced arrangement. The fields produced by either of the inductors will be everywhere parallel to the other inductor coil and their mutual inductance will be eliminated. Under such an arrangement the indicating instrument 26 connected to the inductor coil 16 will indicate zero or a null condition in the absence of a short circuit in the test coil 18.

In the preferred embodiment of the invention, illustrated in Fig. 3, compensation of the mutual inductance between the inductor coils is obtained by a magnetic bridge arrangement employing U-shaped inductor cores which are spaced longitudinally from each other and have a magnetic compensating path 30 extending diagonally therebetween. The inductor cores 10 and 12 may be stamped or otherwise formed from iron laminations of the type employed in motor armatures. Each core has a central or web portion 32, 34 with a pair of extended leg portions 36, 38 and 40, 42 respectively. The compensating path 30 may be formed from laminated iron strips and extends diagonally between opposite legs such as 36 and 42, of the cores 10 and 12, respectively, the ends of the magnetic compensating path 30 being slightly spaced from the adjacent faces of the legs 36 and 42 so as to form air gaps 44 and 46 therebetween, substantially as shown. Such an arrangement provides a balanced magnetic bridge whereby exact compensation for the mutual inductance between the inductors 14 and 16 may be obtained.

The effect of the compensating path may be illustrated by observing the directions of the fields in the cores 10 and 12 when a periodically varying voltage is impressed upon the inductor coil 14. At a particular time, the magnetic field traversing core 10 may be in a clockwise direction as indicated by the dashed path A, the magnetic field flowing upward through leg 36 across the air gap between the legs 36 and 38, downward through leg 38 and across the web portion 32 back to the leg 36 to constitute a closed loop or path. The field induced in core 12, due to the fact that a substantial portion of the field in core 10 is completed through the air between the legs 36 and 38 thereof, flows in a similar direction in the core 12 as indicated by the dashed path B, the latter field flowing downward through leg 42, through the web portion 34, upward through leg 40 and across the air gap between the legs 40 and 42 to constitute a closed loop or path.

The compensating path 30 extends diagonally between oppositely aligned legs of the cores 10 and 12 and induces a magnetic field through the compensating path 30 from core 10 in core 12 which is opposite in phase and of the same magnitude as the field induced in the core 12 due to the mutual inductance between the inductor coils. The spacing or the air gaps 44 and 46 formed between the cores and the ends of the compensating path 30 is made such as to provide the correct amount of phase adjustment to assure that the compensating field induced in core 12 will be exactly opposite in phase to the field produced therein through the air from the core 12, as the latter field may be slightly displaced in phase from the field in core 10 by reason of the longitudinal spacing of the cores. The dimensions of the cores and the separation therebetween together with the dimensions of the compensating path, will depend on the particular installation and may be determined experimentally. A voltmeter connected across the inductor coil 16 may be used to indicate when the bridge is balanced, a null reading thereon indicating a balance condition.

In accordance with the invention further, internal capacitive effects existing between the turns of the test coil and prevailing at high frequencies customarily employed in prior art forms of short circuit coil testers, are minimized herein by employment of a low frequency source of periodically varying voltage. In order to avoid the effect of stray 60 cycle fields encountered in the plant or shop, a frequency preferably different from 60 cycles is employed. Frequencies ranging from 100 to 1000 C. P. S. can be used, although slightly higher frequencies may be employed for testing of smaller coils having a considerable number of turns thereon. The energizing voltage may be supplied from a suitable low frequency generator or from a convenient 60 cycle source connected to the inductor coil 14 through suitable frequency changing apparatus as illustrated in Fig. 3. Alternating current from a 115 volt, 60 cycle supply is applied through conductor 50, switch 52, a frequency multiplying network comprising a series combination of a half-wave selenium rectifier 54 and a condenser 56, the latter being connected to one terminal of the inductor coil 14. The other terminal of coil 14 is connected back to the other side of the supply source through conductor 58.

With the above arrangement a selection of a number of frequencies different from 60 cycles is provided as the output of the rectifier 54 is rich in harmonic content. The condenser 56 serves to provide some attenuation of the lower frequencies. A condenser 60, connected in shunt across the terminals of inductor coil 14, forms a tuned circuit therewith resonant to one of the harmonic frequencies, say 180 C. P. S., in the output of the frequency multiplying network.

To complete the description of the circuits employed in the apparatus shown in Fig. 3, one side of the inductor coil 16 is connected through conductor 62 to a crystal rectifier 64 and then to one side of a D. C. indicating instrument 66, the other side of the latter being connected through conductor 68, a current limiting resistor 70 and to the other side of the inductor coil. Shunted directly across the inductor coil is a condenser 72 that provides therewith a circuit tuned to the frequency of the voltage impressed on the inductor coil 14, i. e. 180 C. P. S. The rectifier 64 may be a type 1N 34 crystal diode, for example, and serves to rectify the voltage appearing across the terminals of the inductor coil 16 for application to the indicating instrument 66 which may be a 0–50 microampere ammeter. A similar crystal diode 74 is connected directly across the D. C. meter 66 and provides a variable shunt therefor whereby substantially full scale deflection of the meter 66 may be obtained with coils of different size and number of turns that may be tested with the apparatus.

Figure 4:
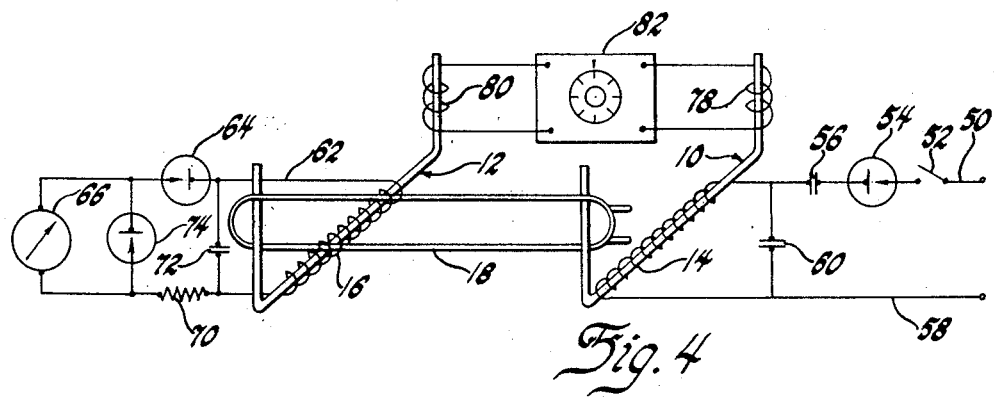
Fig. 4 illustrates still another form of the invention.

Fig. 4 illustrates another form of the invention in which compensation for the mutual inductance between the inductors 14 and 16 is obtained by electric circuit instead of by magnetic balancing means. This is accomplished by provision of a pair of auxiliary coils 78 and 80 which are placed or wound on respective ones of the cores 10 and 12 and which are differentially interconnected so that the respective voltages induced therein will be in phase opposition to each other. The coils 78 and 80 are interconnected through a transducer 82, which may comprise a variable phase shifter and attenuator of conventional design, so as to make the voltage induced in coil 78 exactly equal in magnitude and opposite in phase to the voltage induced in coil 80 due to field in core 10 linking with core 12, whereby the mutual inductance between the inductor coils 14 and 16 will be eliminated. The remainder of Fig. 4 is the same as that shown in Fig. 3.

It will be understood that the above described arrangements are illustrative of the application of the principles of the invention. Numerous other arrangements may be devised by those skilled in the art without departing from the spirit and scope of the invention.

I claim:

1. A balanced magnetic bridge comprising, in combination, a pair of spaced U-shaped cores each having a web portion and extended leg portions on opposite ends of said web portion, an inductor coil wound on each of said cores, a magnetic core extending diagonally between said spaced cores from the leg portion of one of said cores to the opposite leg portion of the other of said cores, the ends of said diagonally extending core being spaced slightly from said U-shaped cores.

2. Electrical apparatus for testing a coil for the presence of a short circuit condition therein comprising, in combination, a pair of spaced magnetic cores each adapted to receive a part of said coil to be tested, an inductor for each of said cores, magnetic compensating means between said cores preventing coupling between said inductors, a source of alternating current of local power line frequency for energization of one of said inductors, frequency changing means connected between said source of alternating current and said one inductor for changing the frequency of the current supplied thereto, means connected to the other of said inductors to form a frequency selective circuit therewith responsive to the frequency changing means and indicating means connected to said frequency selective circuit.

References Cited in the file of this patent

UNITED STATES PATENTS

| | | |
|---|---|---|
| 1,683,389 | Kaehni | Sept. 4, 1928 |
| 2,227,029 | Schlesinger | Dec. 31, 1940 |
| 2,437,455 | Berman | Mar. 9, 1948 |
| 2,477,057 | Grady | July 26, 1949 |
| 2,645,753 | Dutschke | July 14, 1953 |

FOREIGN PATENTS

| | | |
|---|---|---|
| 178 of 1913 | Great Britain | June 12, 1913 |